July 12, 1966     E. E. ALBRIGHT     3,260,830
GLOW RING INDICATOR DIAL
Filed April 1, 1964     2 Sheets-Sheet 1
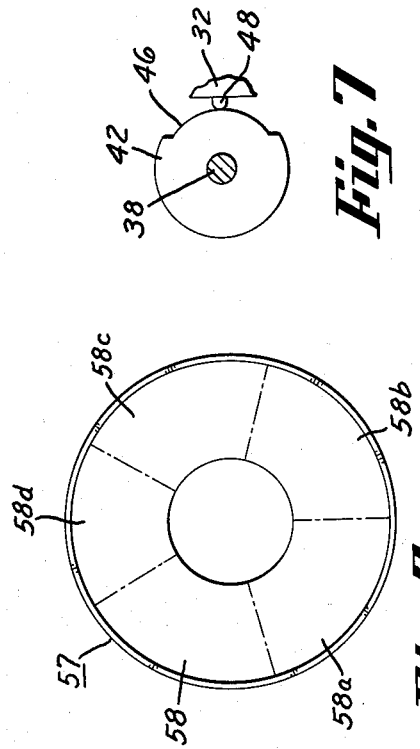
Fig. 7
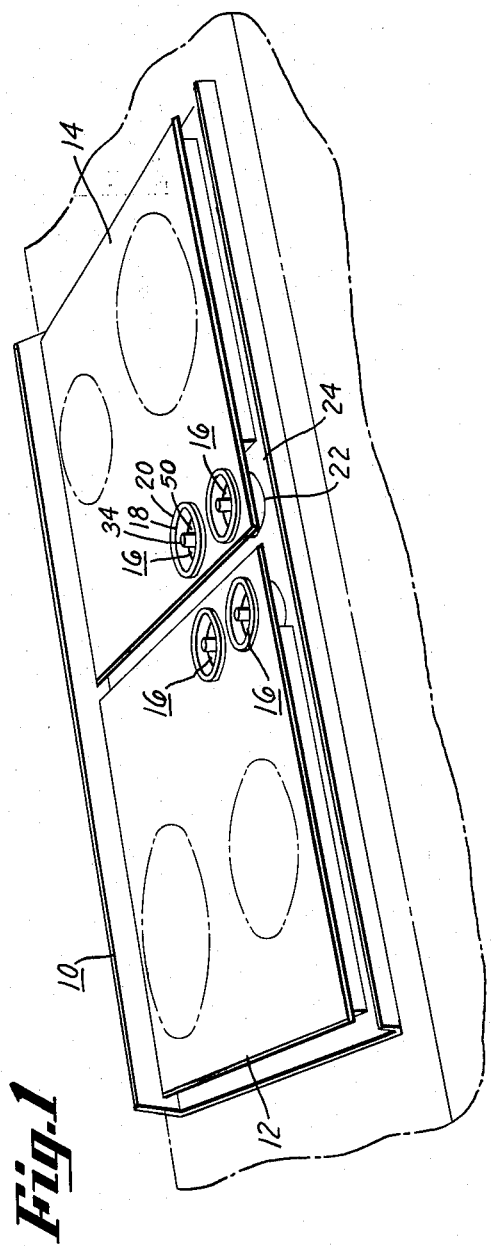
Fig. 1
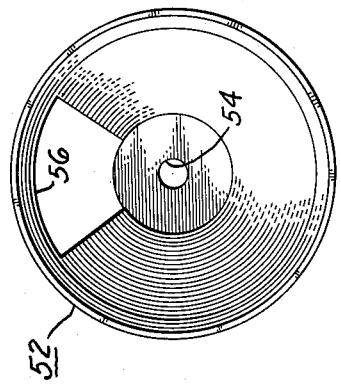
Fig. 6
Fig. 5
INVENTOR.
EDWARD E. ALBRIGHT
BY J.C. Evans
ATTORNEY

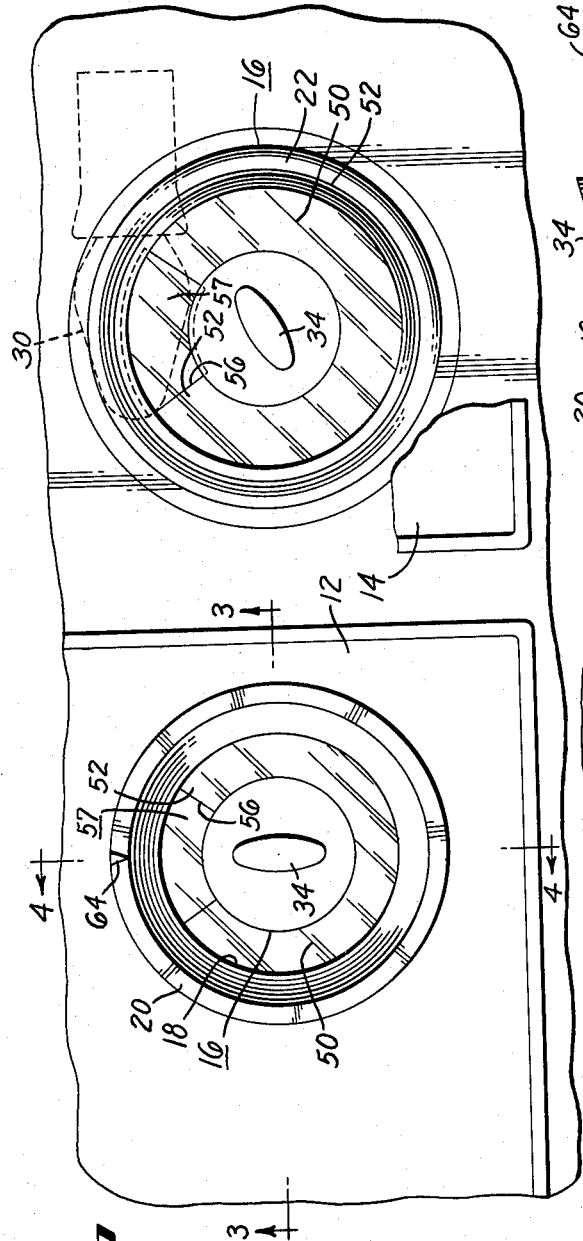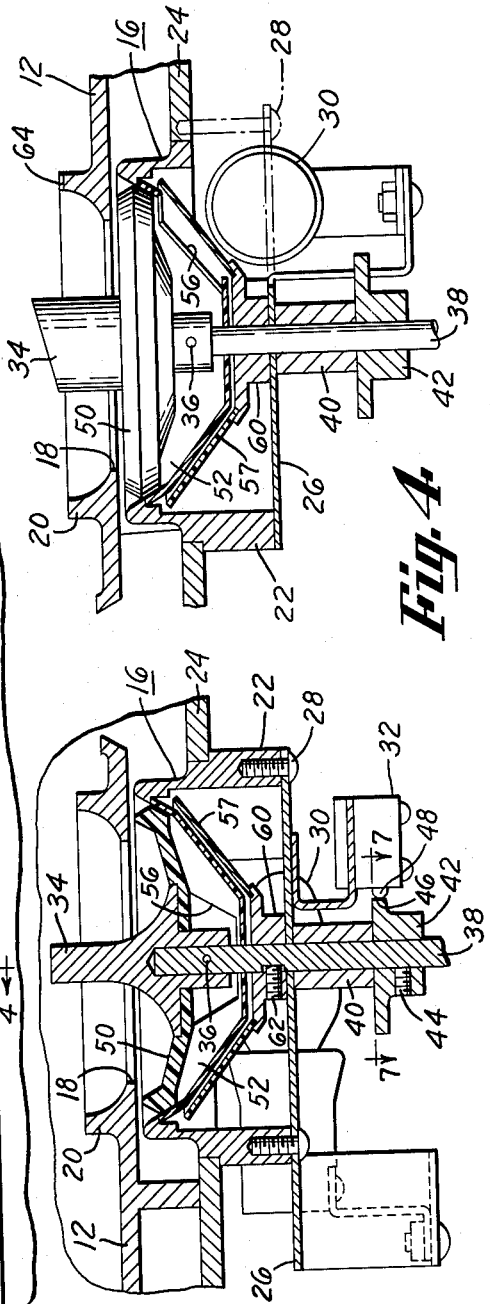

United States Patent Office 3,260,830
Patented July 12, 1966

3,260,830
GLOW RING INDICATOR DIAL
Edward E. Albright, Bloomfield Hills, Mich., assignor to General Motors Corporation, Detroit, Mich., a corporation of Delaware
Filed Apr. 1, 1964, Ser. No. 356,514
4 Claims. (Cl. 200—167)

This invention relates to domestic appliances and more particularly to an illuminated indicator dial for determining the operative conditions thereof.

One problem in domestic appliances, for example, a domestic range unit or the like is that it is difficult to tell at a glance the operative condition of a component part thereof such as one of its surface heating units.

An object of the present invention, therefore, is to improve an indicator for a domestic appliance such as a range unit having surface heating units by the provision of an improved illuminated dial including means for generally indicating the controlled state of a particular component including means for specifically indicating the exact controlled point of the component.

A further object of the present invention is to improve an indicator dial arrangement for use in a domestic appliance, such as a range, by the provision of a color-coded element interposed between a light source and a viewing field for producing a telltale indication of the control of an operative part of the appliance and means interposed between the color-coded element and the viewing field for producing a diffused colored light indication of the general range of control and a specific limited planar area within the viewing field of a sharper illumination for clearly distinguishing indicia means for indicating a specific controlled point of the associated operative component.

Further objects and advantages of the present invention will be apparent from the following description, reference being had to the accompanying drawings wherein a preferred embodiment of the present invention is clearly shown.

In the drawings:

FIGURE 1 is a view in perspective of a built-in cooking top unit including the indicator dial of the present invention;

FIGURE 2 is an enlarged, fragmentary view in top elevation, partially broken away, showing the invention;

FIGURE 3 is a view in vertical section taken along the line 3—3 of FIGURE 2;

FIGURE 4 is a view in vertical section taken along the line 4—4 of FIGURE 2;

FIGURE 5 is a view in top elevation of a reflector component of the invention;

FIGURE 6 is a view in top elevation of a color-coded element of the present invention; and FIGURE 7 is a view in horizontal section taken along the line 7—7 of FIGURE 3.

Referring now to the drawings, in FIGURE 1 a drop-in cooking surface unit 10 is illustrated including removable cover plates 12, 14 with openings therein shown in dotted lines for receiving suitable surface heating elements, for example, gas burners or spirally coiled, sheathed, electrical resistant heater units. In the illustrated arrangement, adjacent corner portions of each of the cover plates 12, 14 include indicator dial assemblies 16 constructed in accordance with certain of the principles of the present invention and operable to set a control switch or the like for modulating the operative condition of a component of the appliance, for example, the surface heaters thereon.

Referring more specifically to FIGURE 2, a pair of adjacent indicator dials 16 are illustrated. Each dial assembly 16 is located concentrically of an opening 18 formed by an upwardly directed, continuously formed circular flange 20 on the removable cover plate portion of the drop-in range unit. A tubular member 22 is carried by a lower plate portion 24 of the range unit 10, as best illustrated in FIGURES 3 and 4. On the lower end of the tubular member 22 is secured a plate 26 by suitable fastening means representatively shown as screws 28 with the plate 26 serving to locate a light bulb 30 on one side of the assembly and a microswitch unit 32 on another side of the assembly.

The assembly 16 further includes a rotatable knob 34 directed upwardly through the opening 18 and having a bottom portion thereof secured by means of a pin 36 to a depending spindle 38 directed through the supporting plate 26 and rotatably supported by a sleeve bearing 40 secured on the underside of the plate 26. Below the sleeve bearing 40 a cam element 42 is fixedly secured by a set screw 44 to spindle 38. A peripheral surface 46 on cam element 42 is thereby rotatable with respect to an inwardly depressible plunger element 48 in the microswitch 32. The spindle 38 also is operatively associated with a suitable switching device (not shown) for effecting a predetermined desired control of a component of a domestic appliance such as surface heating units in the drop-in surface unit 10.

In the illustrated embodiment of the invention concentrically arranged within the upper open end of the tubular support bracket 22 is a ring 50 of a suitable transparent material having the outer periphery thereof located closely adjacent the inner surface of the tubular element 22 and the inner periphery thereof secured by suitable fastening means such as an epoxy glue to the underside of the rotatable knob 34 as best illustrated in FIGURE 3. The ring 50 forms an indicia viewing field for the indicator dial assembly 16 in surrounding relationship with the dial handle 34. The field defined thereby is visible at a glance to indicate the manner in which a particular component of the domestic appliance is being controlled. Below the ring 50 is located a light shield 52 shaped as an inverted, truncated cone having the base thereof supportingly secured on an upper portion of the tubular support member 22 and an opening 54 in the top thereof through which the spindle 38 is directed whereby the ring 50 is freely rotatable with respect to the shield 52. A trapezoidally-shaped window 56 is formed in one side of the shield 52 and the upper surface thereof is light reflective so that any light directed through the trapezoidal window 56 is diffused around the handle 34 as a band of light readily observed through the opening 18 formed above the dial assembly 16 in the cover plates 12, 14. The details of the light shield 52 are more specifically set forth in FIGURE 5 which shows the shield element in top elevation.

Below the light shield 52 is located a similarly shaped element 57 preferably constructed of a relatively translucent material which is divided into a plurality of segments 58, 58a, 58b, 58c and 58d as best shown in FIGURE 6. The segments 58 through 58d are configured in accordance with the particular indication desired and can be formed as a gradually varying, colored spectrum or a series of distinct color hues corresponding to particular control points, for example, light yellow for a low-heat position, orange for a medium-heat position and red for a high-temperature heating position. The colored element 57 has the radially innermost portion thereof secured within the top of a hub 60 that is fixedly secured to the spindle 38 by suitable means such as a set screw 62 whereby upon rotation of the spindle 38 by the control handle 34, the colored element is rotated relative to the opening 56 in the shield 52. As will be best observed in FIGURE 4, the light bulb 30 is located immediately below the color graduated element in direct alignment with the window 56 in the light shield 52.

In the illustrated embodiment of the invention, one feature is that the planar extent of the trapezoidally-shaped opening 56 substantially corresponds to the regions 58 through 58d on the element 57. Moreover, when the control handle 34 is positioned as illustrated in FIGURES 2 and 3, an upper portion of the handle is aligned with an indicator pointer 64 representatively illustrated as being formed on the inside surface of the flange 20 and the region 58d is located equally on either side of the pointer 64. In this position the cam element 42 is arranged so that the surface 46 thereon, where recessed, is located equidistantly on either side of the depressible plunger 48 of the microswitch 32. By virtue of this arrangement, the handle 34 can be rotated in either a clockwise or counterclockwise direction a predetermined distance on either side of the indicator pointer 64 before the higher point on the surface 46 of the cam will cause the plunger 48 to be depressed inwardly to energize the bulb 30. Hence, before the light is turned on, either the region 58 or the region 58c will be substantially located in complete alignment with the opening 56 in the shield 52.

Hence, by virtue of the above-described arrangement, once the knob 34 has been rotated a predetermined number of degrees on either side of the indicator pointer 64, the bulb 30 will be turned on so as to illuminate the viewing field defined by the ring 50 through the window 56. More particularly, in accordance with certain of the principles of the present invention, the illustrated arrangement will cause light directed from the bulb 30 to be passed through the color graduated element and hence take on a hue corresponding to a particular controlled position of the control knob 34. The particular hue corresponding to the particular controlled position is diffused by reflection from the upper surface of the shield 52 so as to create a colored band or glow ring around the handle 34 that will indicate the general operative condition, for example, medium heat range, of a component of the domestic appliance associated with the dial assembly.

Another feature of the above-described arrangement is that the means for creating the general indication also produces a particular or specific indication of a single control point. For example, in the illustrated arrangement, suitable indicia can be included either on the ring 50 or the shield 57, or in line therewith, for example, indicia indicating low, medium and high surface unit temperatures or an infinite temperature range between predetermined limits. The indicia, upon rotation of the knob 34, will be moved relative to the window 56 in the shield 52. Because of the fact that the bulb 30 is located in close proximity to the window 56, in the general field of vision defined by the ring 50, the window 56 will show as a hot spot or sharply illuminated planar region of limited extent as compared to the overall field of vision in which the indicia is sharply illuminated to readily indicate at a glance a specific or particular condition of operation. Furthermore, the sharply illuminated viewing window 56 will, if cam configuration and colored regions on the sheet 57 are as illustrated, only show regions 58 through 58c with region 58d constituting an off range.

In view of the aforesaid remarks, it will be appreciated by those skilled in the art that the present invention gives a highly desirable indication which at a glance tells generally what an operative component of a domestic appliance is doing and on more careful viewing indicates its specific action. Moreover, both the general and the specific indications are made possible by the same structure.

While the embodiment of the present invention as herein disclosed constitutes a preferred form, it is to be understood that other forms might be adopted.

What is claimed is as follows:
1. In an indicator dial assembly the combination of, a light source, means including a rotatable element, an annular transparent member on said element defining a viewing field completely around said element, a light shield interposed between said viewing field and said light source having a light reflective upper surface, said light shield blocking said light source from said viewing field, means forming an aperture in said light shield for directing light from said source against said reflective upper surface, said reflective upper surface directing light from said source for diffusion throughout said annular transparent member to form a glow ring around said rotatable element, a colored light transmittable element secured to said rotatable element for rotation therewith interposed between said light source and said aperture to color the diffused light through said annular member for indicating a general control range, and indicia means within said field of vision for indicating specific control points, said light source being located in close proximity to said light shield aperture for producing a sharply illuminated planar area in said glow ring including a specific indicia means set forth thereby to indicate a specific control point.

2. In an indicator dial assembly the combination of, a light source, a rotatable element, an annular transparent member secured to said rotatable element forming a field of vision therearound, a light shield interposed between said light source and said transparent member, said light shield blocking said light source from said viewing field, said light shield having a light reflective upper surface and including an opening extending throughout a portion of the planar extent thereof, a colored light transmittable element secured to said rotatable element for rotation therewith located between said source of light and said light shield opening, said colored element directing light from said source through said light shield opening for reflected diffusion from the reflective upper surface of said shield through said transparent member to form an annular glow ring around said rotatable element to indicate general control, indicia means within said field of vision, said light source being located closely adjacent said shield opening for producing a hot spot in said glow ring for sharply illuminating said indicia means to indicate a specific control point at a glance.

3. In an indicator knob assembly the combination of, a source of light, fixed support means, a rotatable element rotatably supported on said fixed support means, an annular transparent member secured to said rotatable element for rotation therewith defining a field of vision around said rotatable member, a light shield carried by said fixed support means having the shape of an inverted truncated cone with the base thereof being fastened to said fixed support means, said light shield underlying said annular transparent member throughout its planar extent and blocking said light source of light from said transparent member, said light shield having a light reflective upper surface and including an opening on one side thereof aligned with said light source, said light reflective upper surface directing light from said light source and diffusing it through said annular transparent member to form a glow ring around said rotatable element, a colored light transmittable member having an inverted truncated cone shape like that of said light shield located between said light source and said light shield in overlying relationship therewith, said colored member having the top thereof secured to said rotatable element for rotation therewith with respect to said light shield opening, said colored member serving to direct light from said source through said light shield window to be reflected from the upper surface of said shield and diffused through the field of vision formed by said transparent member to color said glow ring, indicia means in said field of vision, said light source being located in close proximity to said light shield opening for sharply illuminating said indicia means through the planar extent of said opening to produce a hot spot within the glow ring to indicate a specific control point.

4. An indicator dial assembly comprising, fixed support means, a light source, means including a rotatable element rotatably supported on said fixed support means, a transparent annular member on said rotatable element defining a viewing field around said rotatable element, said transparent member being horizontally disposed with respect to said fixed support means, a light shield between said viewing field and said light source having a light reflective upper surface, said light shield being connected to said fixed support means and underlying said annular transparent member throughout its planar extent, said light shield blocking said light source from said viewing field, means forming an opening in said light shield having a predetermined configuration, a colored light transmittable element secured to said rotatable element for rotation therewith with respect to said opening, said light source being located in close proximity to said opening, said light reflective upper surface of said light shield directing light from said source and diffusing it through said annular transparent member to form a glow ring about said rotatable element, said opening in said light shield forming a hot spot in said glow ring to indicate a specific control point, switch means secured to said fixed support means and operable to turn on said light source, and means on said rotatable member for conditioning said switch means to turn on said light source upon rotation of said rotatable element a predetermined distance on either side of a predetermined reference position, said colored element including a plurality of distinct control indicating regions, said regions being arranged with respect to said rotatable element for substantially completely filling said light shield opening with one of the indicating regions when said rotatable element is moved sufficiently to turn on said light source.

References Cited by the Examiner

UNITED STATES PATENTS

| | | | |
|---|---|---|---|
| 2,541,892 | 2/1951 | Schulze | 200—167 X |
| 2,607,873 | 8/1952 | Sheidler | 200—167 X |
| 2,713,103 | 7/1955 | Slate | 200—167 |

ROBERT K. SCHAEFER, *Primary Examiner.*

KATHLEEN H. CLAFFY, *Examiner.*

H. O. JONES, *Assistant Examiner.*